United States Patent [19]

Park et al.

[11] 4,420,466

[45] Dec. 13, 1983

[54] PROCESS FOR PRODUCING PHOSPHORUS PENTOXIDE

[75] Inventors: Won C. Park, Irvine; Jacob J. Mu, Santa Ana, both of Calif.

[73] Assignee: Occidental Research Corporation, Irvine, Calif.

[21] Appl. No.: 376,341

[22] Filed: May 10, 1982

[51] Int. Cl.$^3$ .................... C01B 25/12; C01B 25/16; C01B 25/01; C01B 25/02
[52] U.S. Cl. .................... 423/304; 423/167; 423/318; 423/322; 423/323
[58] Field of Search ............... 423/304, 318, 322, 323, 423/167; 44/10 H

[56] References Cited

U.S. PATENT DOCUMENTS

| | | | |
|---|---|---|---|
| 1,655,981 | 1/1978 | Barr | 423/318 |
| 3,235,330 | 2/1966 | Lapple | 423/304 |
| 3,241,917 | 3/1966 | Lapple | 423/304 |
| 4,351,809 | 9/1982 | Megy et al. | 423/167 |
| 4,351,813 | 9/1982 | Megy et al. | 423/304 |

Primary Examiner—Gregory A. Heller
Attorney, Agent, or Firm—Walter A. Hackler

[57] ABSTRACT

A process for producing phosphorus pentoxide from phosphate ore includes the mixing and formulation of a feed mixture of phosphate ore with lime and solid carbonaceous material in amounts to produce a feed mixture having a $CaO/SiO_2$ mole ratio greater than about 8.0. This mixture is formed into pellets which are then exposed to radiation eminating from an oxidation zone, preferably within a rotary type kiln, in order to heat the pellets to a temperature sufficient to reduce the phosphate by reaction with the solid carbonaceous material to form elemental phosphorus vapor without substantial melting of the pellets. Sufficient oxygen-containing gas is provided to cause oxidation of the elemental phosphorus vapor within the oxidation zone to produce phosphorus pentoxide.

12 Claims, 4 Drawing Figures

PROCESS FOR PRODUCING PHOSPHORUS PENTOXIDE

The present invention pertains generally to the reduction of phosphate ores and more particularly, the invention relates to a specific phosphate ore feed mixture, or combination, for producing phosphorus pentoxide in a kiln at a rapid reduction rate without substantial melting of the feed mixture within the kiln.

In a kiln furnace process for producing phosphorus pentoxide such as described by Lapple in U.S. Pat. Nos. 3,235,330 and 3,241,917, a reaction bed comprised of fluorapatite ore, carbonaceous material and silica is heated to reductively extract elemental phosphorus which in turn is burned over the reaction bed to provide the endothermic heat necessary in the reduction reaction between the carbon and the phosphate ore. This process, in theory, is more energy efficient than producing phosphorus pentoxide using an electric-arc furnace because in the latter, the reduced elemental phosphorus must be burned separately to form phosphorus pentoxide and the heat of oxidation therefrom is not effectively recovered.

However, the rotary kiln process has heretofore not been commercially practical because of poor phosphorus pentoxide yield therefrom and this, in part, has been due to melting of the kiln change, or feed materials, before the majority of the phosphate ore has been reduced by the carbonaceous material in the feed mixture.

To enhance the reductive reaction between the phosphate ore and the carbonaceous material, the ore is first beneficiated to remove impurities, and then ground and pressed, or formed, into feed balls along with carbonaceous material and silica. The grinding and compression of the ore, carbonaceous material and silica into balls, or pellets, promotes intimate contact therebetween in order to promote the reduction reaction. Melting may disrupt operation of the rotary kiln.

Some melting of the feed materials within the rotary kiln can be tolerated, however, if more than about 30% of the reaction bed begins to melt, agglomeration of the feed particles within the reaction bed may occur. These agglomerations grow in size and may adhere to interior surfaces of the kiln thus blocking movement of the reaction bed through the kiln.

It is well known (Lapple) that many impurities, such as fluorine, act as fluxing agent causing the feed mixture to melt at lower temperatures, such lower temperatures resulting in a slower reduction rate of the phosphate ore as hereinabove discussed. (See also co-assigned U.S. patent application Ser. No. 265,305 to Megy et al. now U.S. Pat. No. 4,351,809).

The present invention is directed to a process for reducing phosphate in phosphate containing ores and producing a phosphorus pentoxide, without substantial melting of the feed mixture, by utilizing a specific phosphate ore feed mixture.

Further, the process enables the use of a shorter rotary kiln than previous processes because the reduction process proceeds at a more rapid rate to more complete reduction of the phosphorus pentoxide.

SUMMARY OF THE INVENTION

The process in accordance with the present invention for producing phosphorus pentoxide from phosphate ore includes the steps of mixing beneficiated phosphate ore with lime and solid carbonaceous material in amounts to produce a feed mixture having a CaO/SiO$_2$ mole ratio greater than about 8.0, forming the feed mixture into pellets; heating the pellets, by exposure to radiation emanating from an oxidation zone to a temperature sufficient to reduce the phosphate in the pellets by reaction with the solid carbonaceous material to form elemental phosphorus vapor without substantial melting of the pellets and, providing sufficient oxygen-containing gas to cause oxidation of the elemental phosphorus vapor within the oxidation zone to produce phosphorus pentoxide and to heat the pellets.

More particularly, the process includes co-grinding the feed mixture so that 50 to 85 percent of the co-ground feed mixture passes a $-325$ mesh before forming the feed mixture into pellets and heating the pellets in a rotary-type kiln to a temperature of approximately 1500° C. for less than one hour.

BRIEF DESCRIPTION OF THE DRAWINGS

The advantages and features of the present invention will be better understood by the following description and drawings in which.

DETAILED DESCRIPTION

Figure 1:
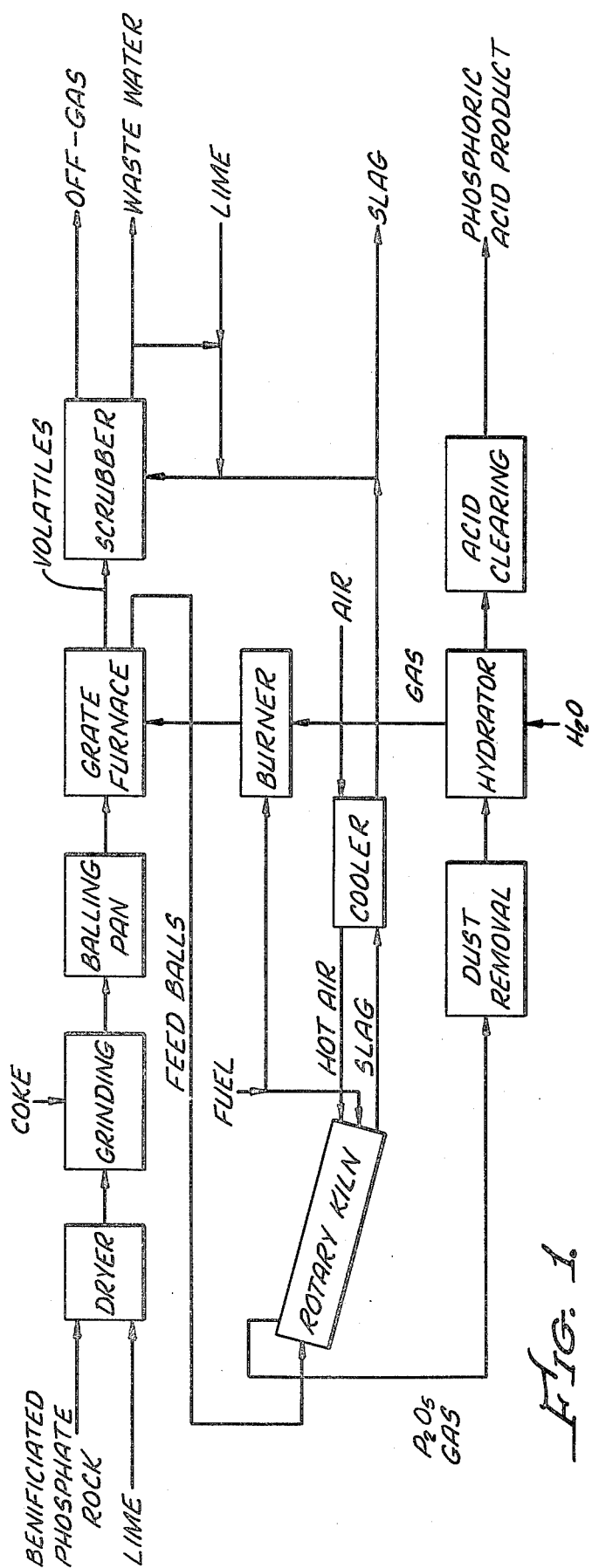
FIG. 1 is a block diagram of a rotating kiln process for the production of phosphoric acid showing a rotary kiln for the production of phosphorus pentoxide (P$_2$O$_5$)

Turning now to FIG. 1, there is generally shown, in block-diagram form, a kiln process for the production of phosphoric acid. The following description of the process is provided as background information to provide a better understanding of the present invention.

In general, phosphate rock, or ore, suitable for use in a rotary kiln process should be beneficiated using current industry practices. Typical impurities, such as iron, sodium, potassium, and aluminum generally adversely affect the process and most of these impurities are removed by beneficiation of the ore which generally includes screening the ore to remove coarse material therefrom, elutriation to remove clay materials, fatty acid flotation to separate phosphate ore from the clay impurities and large silica particles, and finally an amine flotation to separate the fine silica from the phosphate ore.

The reductive extraction of phosphorus from the beneficiated ore is the result of the reaction between phosphate ore, such as fluorapatite, solid carbonaceous material such as coke or coal, and silica, namely, Ca$_{10}$(PO$_4$)$_6$F$_2$ + carbon + silica + 12,700 BTU (per lb of phosphorus) → phosphorus gas + carbon monoxide + calcium silicate, these reactants should be held in close proximity to each other during the course of the reaction at the proper relative concentration of each reactant. Hence, it is preferred that the feed materials be agglomerated, or pelletized. This agglomeration also reduces dust within the kiln and reduces clinker formation which may occur if small individual particles of a loose feed material of ore silica and coke were fed into the rotary kiln.

Feed balls, or pellets, are prepared by drying the beneficiated phosphate ore, grinding the beneficiated phosphate ore together with coke and lime and thereafter forming the mixture into generally spherical balls with a conventional balling pan. Alternatively, the phosphate ore and coke may be mixed with lime hydrate, limestone, dolomite or another source of CaO. The balls are then fed to a grate furnace to drive off any volatile materials contained therein.

As shown in FIG. 1, gases driven off of the grate furnace are passed for elimination from the system and the preheated feed balls are fed into a ported rotary kiln 10. Solid residue, or slag, is removed from the rotary kiln and passed through a cooler for cooling the residue and simultaneously heating input air for the rotary kiln 10. Product gas, or vapor, $P_2O_5$, is removed from the rotary kiln and passed through a dust removal stage and a hydrater to form phosphoric acid and thereafter cleaned to produce a product phosphoric acid as is well known in the art.

Figure 2:
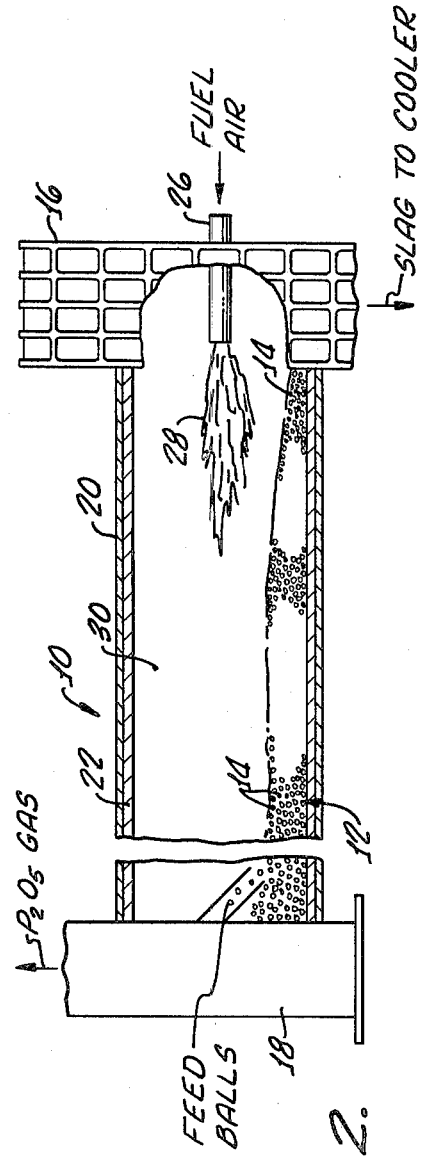
FIG. 2 is a diagram of a rotary-type kiln for carrying out the process of the present invention.

FIG. 2 more particularly illustrates a rotary-type kiln 10 for carrying out the process of the present invention. Although it may be possible to carry out the present invention utilizing a traveling grate or the like, a rotary kiln is particularly adapted for the reduction of phosphate ores because of its efficiency in transferring heat directly to a porous bed 12 consisting of feed balls 14 as hereinabove described. The rotary-type, or rotating, kiln may be of conventional design, having stationary end portions 16, 18, and a rotating center section, or cylinder 20 interconnected therewith, mechanism for rotating the cylinder 20 not being shown in FIG. 2.

Fuel and air, or oxygen, are fed to a burner 26 which produces a flame 28 for directly heating the porous bed 12. It is to be appreciated that the term "flame" within the meaning of this specification includes either the luminous portions of an oxidizing reaction, the hot gases associated therewith, or both.

For start-up, a conventional fuel may be used to preheat the kiln center portion 20 and the reaction bed 12, but as the reaction in the bed produces elemental phosphorus vapor and carbon monoxide which are bound in an oxidation zone 30, less fuel is required. Sufficient air, or oxygen, must be provided, however, to oxidize the phosphorus and the carbon monoxide, above the bed in the oxidation zone 30 for heating the bed by radiation therefrom.

The present invention is particularly directed to a process for the reduction of phosphate ores such as fluorapatite ($Ca_{10}(PO_4)_6F_2$), the reduction reaction being generalized as:

$$Ca_{10}(PO_4)_6F_2 + 15C + 9XSiO_2 \rightarrow 15CO + 3/2P_4 + 9[CaO \cdot XSiO_2] + CaF_2,$$

where $0 \leq X \leq 5$.

Little reaction kinetic information has been known regarding the hereinabove noted reduction reaction for phosphorus oxide. This may be due to the fact that prior furnace techniques for the reduction of phosphorus oxides proceeded in the molten phase. Hence, kinetic studies in the literature were concerned with liquid phase reduction. In the process of concern of this invention, however, the melting of the solids in the feed balls 14 within the bed 12 leads to agglomeration, or clinkering, of the feed balls, which causes undesirable material handling problems in the operation of rotary-type kilns, and inhibits the reduction reaction thus producing less phosphorus yield from the feed.

The amount of phosphate ore reduction was experimentally determined with the use of a typical thermogravimetric analyzer (TGA), not shown, consisting of an electronic balance, a closed furnace, temperature control, gas mixing system, sample boat, and a recording system. The analyzer, which is typical of those well known in the art, measures the weight of a material and its rate of change continuously, either as a function of increasing temperature or preselected temperature over a period of time. The gas mixing system, not shown, includes a flow meter and means for passing nitrogen gas, carbon monoxide, or a mixture thereof, past ore ball samples, not shown, to regulate the partial pressure of carbon monoxide surrounding the ore ball samples while they are heated within the closed furnace.

Phosphate rock, green coke, silica, and lime having compositions as shown in Table 1, were individually ground and formed into approximately one (1) gram, 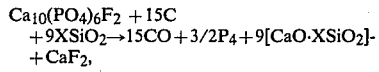 inch diameter, sample ore balls. Sample ore balls were prepared having a CaO to $SiO_2$ mole ratio of approximately 3.2 and approximately 8.5 as shown by Table 2. The sample balls were dried at 110° C. and thermogravimetric analysis was then performed with the thermogravimetric analyzer on the samples isothermally at a number of temperatures from approximately 1300° to approximately 1500° C.

TABLE 1

| Material Analysis for Sample Ore Balls | | |
|---|---|---|
| Material | Mesh Size | Analysis |
| Phosphate Rock | −325 | CaO 45.2% |
|  |  | $P_2O_5$ 32.0% |
|  |  | $SiO_2$ 6.0% |
|  |  | $Al_2O_3$ 0.96% |
|  |  | MgO 0.33% |
|  |  | $Fe_2O_3$ 0.76% |
|  |  | F— 3.7% |
| Green Coke | −325 | Fixed Carbon 89.5% |
|  |  | Volatiles 10.5% |
| Limestone | −325 | $CaCO_3$ 96% |
| Silica | −325 | $SiO_2$ 98% |

Figure 3:
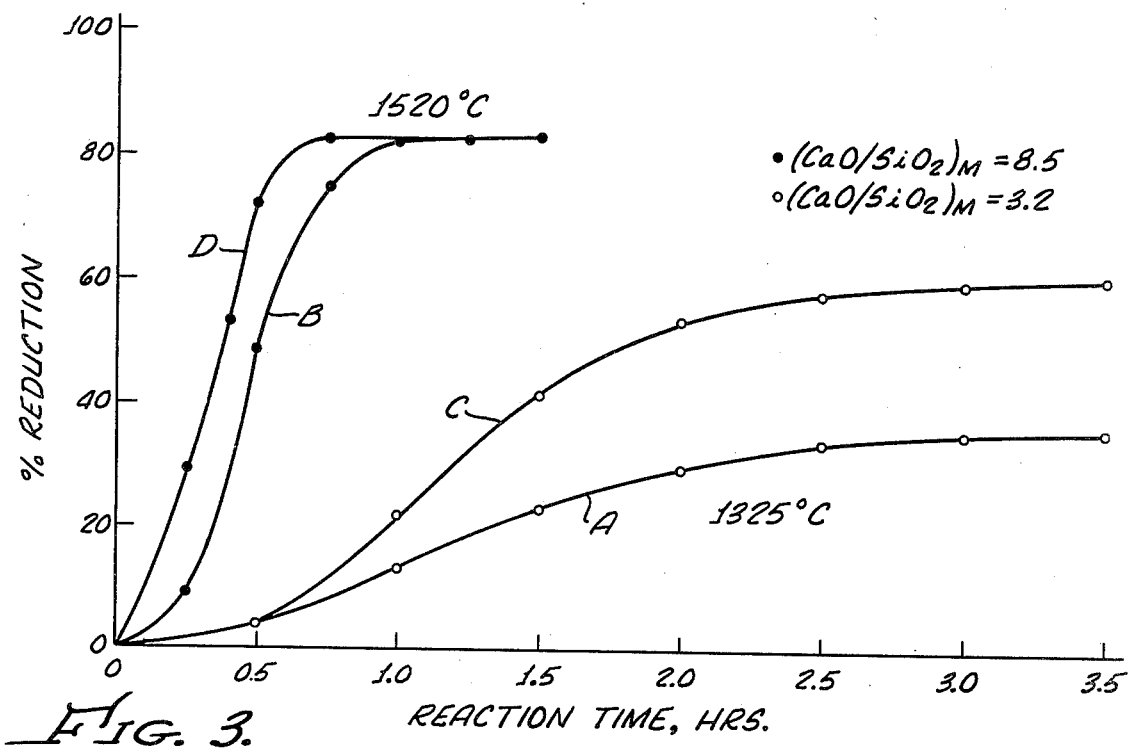
FIG. 3 is a plot showing the percent reduction of phosphate from phosphate ore in sample balls as a function of reaction time and carbon monoxide partial pressure for sample balls having CaO/SiO$_2$ mole ratios of approximately 8.5 and approximately 3.2; and, FIG. 4 is a plot showing the percent of melting as a function of percent reduction of phosphate values from phosphate ore in sample balls having CaO/SiO$_2$ mole ratios of approximately 8.5 and approximately 3.2.

Results of the thermogravimetric analysis (TGA) which included heating the ore balls at a rate of 3° C. per minute from 25° to 1520° C. in a pure carbon monoxide atmosphere is shown in FIG. 3.

As shown in FIG. 3, the percent of reduction of the phosphate ore is significantly greater for $CaO/SiO_2$ mole ratios of approximately 8.5 compared to mole ratio of 3.2. In addition, the reaction time is significantly less, the sample balls with $CaO/SiO_2$ of approximately 8.5 reaching more than 90% reduction in less than one hour. Comparatively, the sample balls have a mole $CaO/SiO_2$ ratio of approximately 3.2 required over two hours to approach the maximum reduction of about 40% at 1325° C. (clinkering temperature). Hence, the rapid kinetics of the high $CaO/SiO_2$ ratio feed balls will enable the process to proceed to significant yield in less than one half the time. As a result, the process may be carried out in a shorter kiln than if a conventional feed ball having a $CaO/SiO_2$ mole ratio of 3.2 is used.

TABLE 2

| Feed Formulations of 3.2 and High Lime Mixtures | | |
|---|---|---|
| | 3.2 Mixture | High Lime (8.5) |
| Beneficiated phosphate rock | 71.6% | 74.2% |
| Coke | 21.6% | 22.4% |
| Silica | 6.8% | — |
| Limestone (96% $CaCO_3$) | — | 3.4% |

FIG. 3 also shows the effect of the CO atmosphere surrounding the feed balls for $CaO/SiO_2$ molar ratios of both 3.2 and 8.5. Curves A and B show the percent reduction in an atmosphere of 100 percent carbon monoxide while curves C and D show the percent reduction in a thirty percent carbon monoxide atmosphere. As shown, the high lime ($CaO/SiO_2 = 8.5$) feed balls are less sensitive to the presence of CO as the low lime ($CaO/SiO_2 = 3.2$) feed balls. Further, it is evident that the equilibrium conversions is about the same for high lime balls, but the low lime feed balls exhibit significant dependence on the amount of CO present.

It is significant that the high lime feed balls do not require a low CO atmosphere for high conversion. Since CO is a reaction product of the reduction reaction between the phosphate ore and the carbon, the CO atmosphere in the reaction bed and around the feed balls will be necessarily high unless it is removed. Removal of the CO from the bed may require the use of a ported kiln so that an inert gas may be used to purge the reaction bed as was described in co-assigned U.S. Pat. applicant No. 265,307 to Megy et al. now U.S. Pat. No. 4,351,813.

While such bed purging may reduce the CO partial pressure in the bed, elaborate equipment is necessary and, in general, adds to the overall process cost.

Another significant function of the process of the present invention is the reduction of melting of the feed balls when a high lime composition is used.

Figure 4:
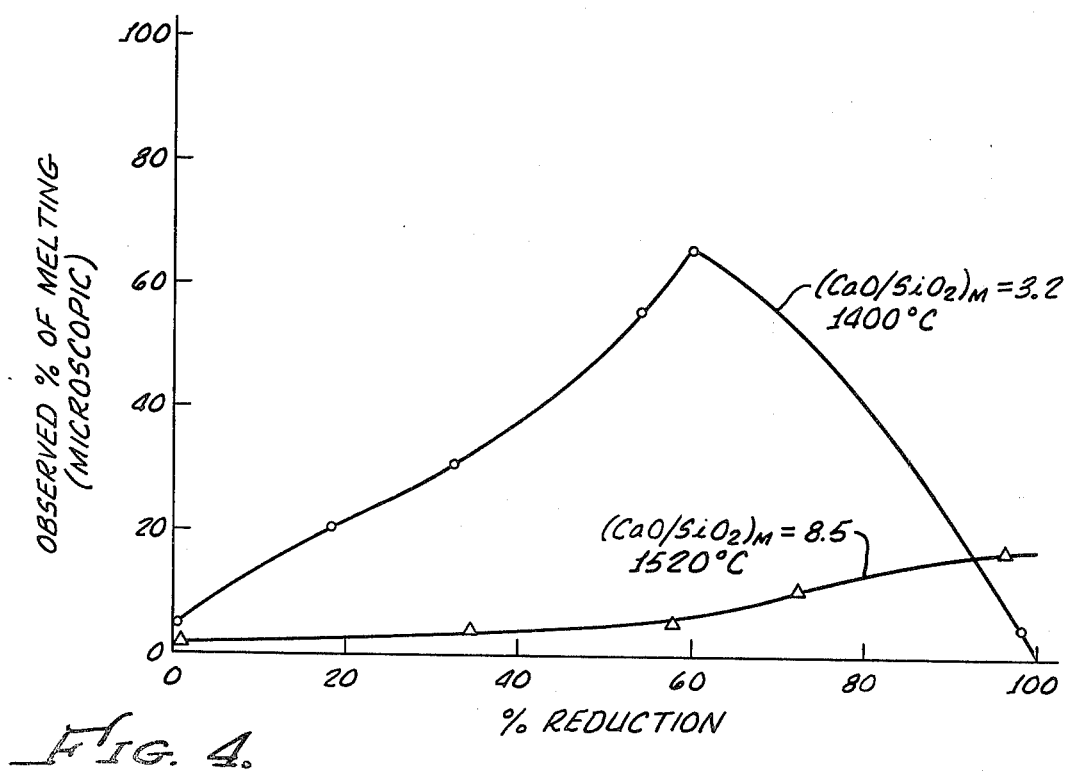

Microscopic observations were made after heating both high lime and low lime balls to determine the extent of melting. The results are shown in FIG. 4 where it is evident that not only is there less percent melting of the high lime feed balls, but that the reduction reaction can be carried out at higher temperature without significant melting. Such higher operating temperatures contribute to the faster reduction rates exhibited in FIG. 3.

The microscopic analysis was made by preparing a thin-section across a sample ball and thereafter examining the thin-section under a polarized optical microscope by means of a standard point-counting method. Under the microscope, melted portions are differentiated from the crystalline phases by its isotropism under cross-polarizers.

Although there has been described hereinabove a specific process for reducing phosphate ore in accordance with the invention for purposes of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

What is claimed is:

1. A process for producing phosphorus pentoxide from phosphate ore comprising the steps of:
   mixing beneficiated phosphate ore with lime and solid carbonaceous material in amounts to produce a feed mixture having a $CaO/SiO_2$ mole ratio greater than about 8.0;
   forming the feed mixture into pellets;
   heating the pellets, by exposure to radiation emanating from an oxidation zone, to a temperature sufficient to reduce the phosphate in the pellets by reaction with the solid carbonaceous material to form elemental phosphorus vapors without substantial melting of the pellets; and,
   providing sufficient oxygen-containing gas to cause oxidation of the elemental phosphorus vapor within the oxidation zone to produce phosphorus pentoxide and to heat the pellets.

2. A process for producing phosphorus pentoxide from phosphate ore comprising the steps of:
   mixing beneficiated phosphate ore with lime hydrate and solid carbonaceous material in amounts to produce a feed mixture having a $CaO/SiO_2$ mole ratio greater than about 8.0;
   forming the feed mixture into pellets;
   heating the pellets, by exposure to radiation emanating from an oxidation zone, to a temperature sufficient to reduce the phosphate in the pellets by reaction with the solid carbonaceous material to form elemental phosphorus vapors without substantial melting of the pellets; and,
   providing sufficient oxygen-containing gas to cause oxidation of the elemental phosphorus vapor within the oxidation zone to produce phosphorus pentoxide and to heat the pellets.

3. A process for producing phosphorus pentoxide from phospate ore comprising the steps of:
   mixing phosphate ore with lime and solid carbonaceous material in amounts to produce a feed mixture having a $CaO/SiO_2$ mole ratio greater than about 8.0;
   forming the feed mixture into pellets;
   heating the pellets to a temperature of approximately 1500° C., by exposure to radiation emanating from an oxidation zone to reduce the phosphate in the pellets by reaction with the solid carbonaceous material to form elemental phosphorus vapors, and carbon monoxide without substantial melting of the pellets; and,
   providing sufficient oxygen-containing gas to cause oxidation of the elemental phosphorus vapor within the oxidation zone to produce phosphorus pentoxide and to heat the pellets.

4. The process of claim 3 further comprising the steps of introducing sufficient oxygen-containing gas to cause oxidation of the carbon monoxide within the oxidation zone to heat the porous bed.

5. A process for producing phosphorus pentoxide from phosphate ore comprising the steps of:
   mixing beneficiated phosphate ore with lime and solid carbonaceous material in amounts to produce a feed mixture having a $CaO/SiO_2$ mole ratio greater than about 8.0;
   forming the feed mixture into pellets;
   heating the pellets, by exposure to radiation emanating from an oxidation zone within a rotary-type kiln, to a temperature sufficient to reduce the phosphate in the pellets by reaction with the solid carbonaceous material to form elemental phosphorus vapors without substantial melting of the pellets; and, introducing into the rotary-type kiln sufficient oxygen-containing gas to cause oxidation of the elemental phosphorus vapor within the oxidation zone to produce phosphorus pentoxide and to heat the pellets.

6. A process for producing phosphorus pentoxide from phosphate ore comprising the steps of:

mixing beneficiated phosphate ore with lime hydrate and solid carbonaceous material in amounts to produce a feed mixture having a $CaO/SiO_2$ mole ratio greater than about 8.0;

forming the feed mixture into pellets;

heating the pellets, by exposure to radiation emanating from an oxidation zone within a rotary-type kiln, to a temperature sufficient to reduce the phosphate in the pellets by reaction with the solid carbonaceous material to form elemental phosphorus vapors without substantial melting of the pellets; and, introducing into the rotary-type kiln sufficient oxygen-containing gas to cause oxidation of the elemental phosphorus vapor within the oxidation zone to produce phosphorus pentoxide and to heat the pellets.

7. A process for producing phosphorus pentoxide from phosphate ore comprising the steps of:

mixing phosphate ore with lime and solid carbonaceous material in amounts to produce a feed mixture having a $CaO/SiO_2$ mole ratio greater than about 8.0;

forming the feed mixture into pellets;

heating the pellets to a temperature of approximately 1,500° C., by exposure to radiation emanating from an oxidation zone within a rotary-type kiln, to reduce the phosphate in the pellets by reaction with the solid carbonaceous material to form elemental phosphorus vapors without substantial melting of the pellets; and introducing into the rotary-type kiln sufficient oxygen-containing gas to cause oxidation of the elemental phosphorus vapor within the oxidation zone to produce phosphorus pentoxide and to heat the pellets.

8. A process for producing phosphorus pentoxide from phosphate ore comprising the steps of:

mixing beneficiated phosphate ore with lime and solid carbonaceous material in amounts to produce a feed mixture having a $CaO/SiO_2$ mole ratio greater than about 8.0;

forming the feed mixture into pellets;

heating the pellets to a temperature of approximately 1,500° C. for less than one hour, by exposure to radiation emanating from an oxidation zone within a rotary-type kiln, to reduce the phosphate in the agglomerated feed particles by reaction with the solid carbonaceous material to form elemental phosphorus vapors without substantial melting of the pellets; and, introducing into the rotary-type kiln sufficient oxygen-containing gas to cause oxidation of the elemental phosphorus vapor within the oxidation zone to produce phosphorus pentoxide and to heat the pellets.

9. A process for producing phosphorus pentoxide from phosphate ore comprising the steps of:

mixing beneficiated phosphate ore with lime and solid carbonaceous material in amounts to produce a feed mixture having a $CaO/SiO_2$ mole ratio greater than about 8.0;

co-grinding the beneficiated phosphate ore, lime and carbonaceous material so that 50 to 85 percent of the co-ground feed mixture passes a $-325$ mesh;

forming the co-ground feed mixture into pellets;

heating the pellets to a temperature of approximately 1,500° C. for less than one hour, by exposure to radiation emanating from an oxidation zone within a rotary-type kiln, to reduce the phosphate in the pellets by reaction with the solid carbonaceous material to form elemental phosphorus vapors and carbon monoxide without substantial melting of the pellets; and, introducing into the rotary-type kiln sufficient oxygen-containing gas to cause oxidation of the elemental phosphorus vapor within the oxidation zone to produce phosphorus pentoxide and to heat the pellets.

10. The process of claim 9 further comprising the steps of introducing sufficient oxygen-containing gas to cause oxidation of the carbon monoxide within the oxidation zone to heat the porous bed.

11. A process for producing phosphorus pentoxide from phosphate ore comprising the steps of:

mixing beneficiated phosphate ore with limestone and solid carbonaceous material in amounts to produce a feed mixture having a $CaO/SiO_2$ mole ratio greater than about 8.0;

forming the feed mixture into pellets;

heating the pellets, by exposure to radiation emanating from an oxidation zone to a temperature sufficient to reduce the phosphate in the pellets by reaction with the solid carbonaceous material to form elemental phosphorus vapors without substantial melting of the pellets; and, providing sufficient oxygen-containing gas to cause oxidation of the elemental phosphorus vapor within the oxidation zone to produce phosphorus pentoxide and to heat the pellets.

12. A process for producing phosphorus pentoxide from phosphate ore comprising the steps of:

mixing beneficiated phosphate ore with dolomite and solid carbonaceous material in amounts to produce a feed mixture having a $CaO/SiO_2$ mole ratio greater than about 8.0;

forming the feed mixture into pellets;

heating the pellets, by exposure to radiation emanating from an oxidation zone to a temperature sufficient to reduce the phosphate in the pellets by reaction with the solid carbonaceous material to form elemental phosphorus vapors without substantial melting of the pellets; and, providing sufficient oxygen-containing gas to cause oxidation of the elemental phosphorus vapor within the oxidation zone to produce phosphorus pentoxide and to heat the pellets.

* * * * *